Jan. 1, 1963 H. GOLDSMITH 3,071,001
LINEAR FLOW METER
Filed Feb. 16, 1960

INVENTOR
Herbert Goldsmith
BY Fidelman & Lavine
ATTORNEYS

United States Patent Office 3,071,001
Patented Jan. 1, 1963

3,071,001
LINEAR FLOW METER
Herbert Goldsmith, Washington, D.C., assignor to National Instrument Laboratories, Inc., Washington, D.C., a corporation of Maryland
Filed Feb. 16, 1960, Ser. No. 9,114
7 Claims. (Cl 73—211)

This invention relates to measuring the rate of flow (or viscosity) of a fluid, whether gaseous or liquid, and more particularly to an improved linear flow meter.

Briefly, a linear flow meter comprises: an elongated housing through which fluid flows. Inside the housing is a viscous resistance element, that is to say a flow restrictor or flow pack comprising one or more elongated narrow passageways which serve as flow channels. Each passageway is so proportioned that under normal working conditions the resistance to flow through the restrictor as a whole is substantially proportional to the rate of flow. A manometer or other device for measuring pressure difference is connected to the housing across the two sides of the flow restrictor so as to measure the pressure difference caused by flow therethrough.

The advantages of the linear type flow meter over those which operate on the Bernoulli principle, i.e., fixed orifices, nozzles, venturi tubes, variable orifices, etc., are well known to those skilled in the art. However, the linear type flow meters are still characterized by certain disadvantages, including inaccuracies, which will be specifically referred to as the accompanying description proceeds.

Thus, despite the linear or laminar flow through a well designed flow restrictor, it has been established experimentally and theoretically that a non-linear pressure drop occurs across the entrance as well as across the exit of the individual flow channels of the flow restrictor. In magnitude, this nonlinear pressure drop is proportional to the product of the fluid density and the square of the volume flow, and is much greater at the entrance than at the exit. It has been found that downstream of the flow channel entrance a distance equal to about twenty times the depth of the channel, flow approaches a laminar distribution and remains laminar until a short distance from the channel exit, at which point the exit nonlinearity appears. It has also been found that if the pressure measuring taps are both disposed within the truly laminar flow region of the flow restrictor or pack, the pressure drop across these taps is proportional to the mean volume flow rate between these taps to a very high degree of linearity. Unfortunately such a construction is difficult and expensive.

Commonly the pressure taps are both placed outside the flow restrictor, but the flow restrictor must then be made relatively long in order to have the linear pressure drop at the laminar flow central portion swamp out the effect of nonlinearities at the ends thereof. This is usually not practical for commercial devices in which the shortest and most compact device and a least possible pressure drop is desired.

Thus as a practical matter the prior art linear flow meters, even those with highly improved flow restrictors, are faced with the existence of errors due to non-linearity of flow. Strictly speaking the instant invention relates to an arrangement which eliminates or at least minimizes such errors.

The principal object of the present invention is to provide a practical linear flow meter of an accuracy hitherto unknown.

Another object is to provide a novel technique for assembling and calibrating an acurate linear flow meter.

Further objects and the advantages of the instant invention will be apparent from the description which follows.

Essentially the instant invention improves a linear flow meter by positioning on each side of the flow restrictor a specially constructed pressure tap; the pressure taps kinematically correct for the channel entrance and exit nonlinearities of the flow restrictor.

An advantage of the preferred mode of the instant invention lies in its provision of a simple technique for assembling the meter in a manner which most accurately corrects for flow non-linearities.

The actual practice of the instant invention can best be described with reference to the attached drawing, wherein FIGURE 1 diagrammatically illustrates a flow meter constructed according to the teachings of the instant invention.

Figure 5:
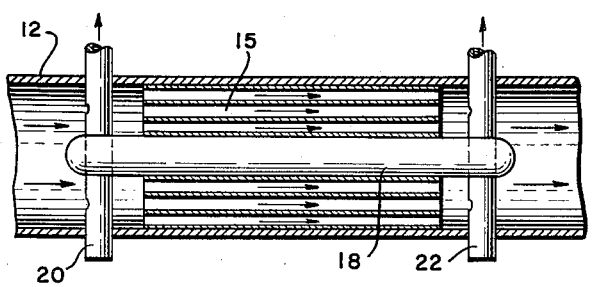

FIG. 5 diagrammatically illustrates an alternate construction for the flow meter.

Figure 1:
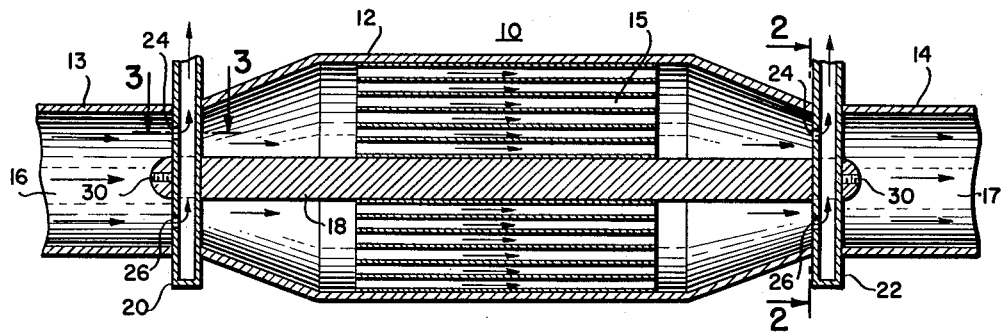

Referring more particularly to FIGURE 1 of the drawing where flow meter 10 is illustrated, the numeral 12 generally designates a tubular housing having reduced ends 13 and 14 which are, in turn, connected with the inlet and outlet connections 16 and 17, respectively, for the fluid whose flow (or viscosity) is to be measured. The flow restrictor 15 packing the main body portion of housing 12 is annularly disposed around an elongated closed arbor 18 which constitutes the core element. The leading and trailing pressure taps of the flow meter are indicated at 20 and 22, respectively. Taps 20, 22 lead to an indicating instrument which may take any one of a number of well-known forms, but which as such, form no part of the present invention, and accordingly is neither shown herein nor specifically referred to hereinafter.

While the details of the flow restrictor or flow pack 15 do not form a part of the instant invention, a particularly advantageous shape is the spiral wound rectangular channel construction disclosed and claimed in co-pending application S.N. 824,423 of Joseph Weichbrod, filed July 1, 1959.

Inside the linear flow element illustrated in FIGURE 1, the pressure difference $\Delta p$ between two cross sections, e.g., between (the exteriors of) taps 20, 22, is related to the mean volumetric flow $Q_m$ by the equation:

(1) $$\Delta p = b\mu_m Q_m + a\rho_m Q_m^2$$

where $a$, $b$ are constants, $\mu_m$, $\rho_m$ are, respectively, the mean viscosity and the mean density (the term mean is here defined as the arithmetic mean of the fluid properties at the two sections for well designed flow meters having small pressure drops; little change in temperature or density occurs between these sections).

The first expression on the right of Equation 1 is the linear term, and arises from the viscous flow in the flow restrictor 15. The second term is non-linear, and arises from the effect of abrupt changes in cross-sectional area together with conversion of velocity profiles from non-equilibrium to equilibrium distributions. (Experimentally it has been found that the second term is a function of, and increases with the Reynolds number.) If it were possible to apply a non-linear correction to the observed pressure differences ($\Delta p$) of Equation 1, only the first term would remain, and the resulting flow meter would be truly linear.

Figure 4:
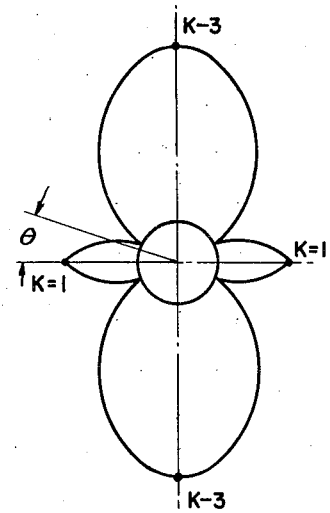
FIGURE 4 is a graphic representation of the pressure distribution formed by flow of an ideal fluid about a cylinder.

Such a correction is used in the practice of this invention. The correction utilizes the pressure distribution at the outside surface of a cylinder immersed in a uniform fluid flowing uniformly at right angles to the cylinder axis. Theoretically and experimentally it has been found that the pressure distribution is a function of $p_0$ and $q_0$, the pressure and velocity head of the undisturbed stream. The usual definition of this velocity head is given by:

(2) $$q_0 = \rho_0 V_0^2 / 2g$$

where $\rho_0$, $V_0$ are the density and velocity of the undisturbed stream and $g$ is the acceleration of gravity. The relation between the local pressure $p$ at the outside surface of the cylinder and $p_0$ and $q_0$ is (3) $$p - p_0 = K q_0$$

where $K$ is a function of both the geometry and the Reynolds number. A simple solution for $K$ has been obtained for the ideal or non viscous fluid and this is depicted in FIG. 4. For this case, $K$ turns out to be independent of Reynolds number and is given by (4) $$K = (1 - 4 \sin^2 \theta)$$

where $\theta$ is depicted in FIG. 4. Note that at the impact point, where $\theta = 0$, as well as where $\theta = 180°$, $K$ takes on the value of 1 and the local pressure at the outside surface of the cylinder is greater than the undisturbed stream pressure by an amount $q_0$. At angles of 30°, 150°, 210°, 330°, the factor $K$ becomes zero, and accordingly the local pressure is equal to the undisturbed stream pressure. At angles of 90° and 270°, $K$ takes on the value $-3$, and the local pressure is less than the free stream pressure by an amount $3q_0$.

If a hollow cylinder is provided with a very small hole that communicates with the exterior space surrounding the cylinder, the pressure within the cylinder may be made to differ from the external free stream pressure by an amount that may be varied from $q_0$ to $-3q_0$, for a total range of $4q_0$, by simply rotating the cylinder about its own axis. This basically is the compensation scheme that is used to add or subtract a non-linear pressure increment to the linear pressure drop produced by fluid flow through flow restrictor 15.

Figure 2:
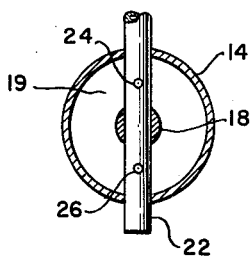
FIGURE 2 is a sectional view along the line 2—2 of FIG. 1.
Figure 3:
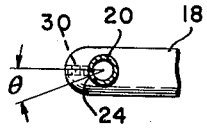
FIGURE 3 is a sectional view along the line 3—3 of FIG. 1.

Thus the pressure taps 20, 22 are small hollow cylinders which extend cross-wise of fluid flow (as shown in FIGURE 1) through the axis of the flow path (see FIG. 2). Desirably, they are mounted adjacent the ends of an extended flow restrictor core 18. Each of the cylindrical taps 20, 22 are provided with two holes 24, 26 which communicate with the interior and are located at the mid radius of the annular flow area 19 between core element 18 and housing 12. One end of each cylindrical tap 20, 22 is capped while the other end communicates with the pressure measuring device. The tap cylinders are, of course, provided with seals at their points of entry through the housing wall of the flow meter.

In practice, the flow meter is proportioned so that the annular area 19 at taps 20, 22 is equal and the density at the taps 20, 22 is very nearly equal to the mean density $\rho_m$. Since the area obstruction caused by the tap cylinders is small, the free stream velocity $V_0$ at the taps is given by (5) $$V_0 = Q_m / A$$

where $Q_m$ is the mean flow described previously. The expression for $q_0$ is then (6) $$q_0 = \rho_m Q_m / 2gA^2$$

If we use the subscript $t$ to describe conditions within the tap, and the subscript 1 and 2 for the upstream and downstream tap, respectively, the pressure difference $\Delta p_{1,2,t}$ that is measured by the pressure measuring device connected to the taps may be written as (7) $$\Delta p_{1,2,t} = (p_{1,t} - p_1) + (p_1 - p_2) - (p_{2,t} - p_2)$$

The first and last terms on the right are the pressure increments developed by the upstream and downstream taps, respectively, and are expressed by Equation 3. The second term is the conventional pressure drop experienced by the linear flow element of FIG. 1, and is expressed by Equation 1. Combining all of these terms into Equation 7, there is obtained (8) $$\Delta p_{1,2,t} = b \mu_m Q_m + \rho_m Q_m^2 \left( a + \frac{K_1 - K_2}{2gA^2} \right)$$

By a suitable choice of $K_1$ and $K_2$ the second expression on the right may be made to vanish for all values of $Q_m$ and there is left only the linear relation (9) $$\Delta p = b \mu_m Q_m$$

From Equation 8 it is clear that $K_2$ should be a positive maximum, a condition which requires that the tap opening be oriented to point directly into the stream. $K_1$, on the other hand, should be negative, which requires that it be oriented at an angle ($\theta$) of from 40° to 80° to the direction of flow.

It is noteworthy that the pressure distribution about the outside surface of the cylinder as described above is rarely encountered in the flow of real fluids. As a result of viscosity, there is a flow separation that develops about the trailing edge of the cylinder, and produces a pressure distribution markedly different from the idealized case illustrated in FIG. 4. However, the leading edge distribution is unchanged, while that situated at 90° to the direction of flow is modified somewhat. (The distribution in a real fluid depends upon Reynolds number in the manner shown in FIGS. 152, 153 and 159 of "Modern Developments in Fluid Dynamics"—vol. II by Goldstein—Clarendon Press 1952.) Up to 45° the pressure distribution is independent of Reynolds number, but beyond this angle the pressure maximum varies from $-q_0$ to $-3.5 q_0$ at locations from 70° to 82° over a range of Reynolds number from 2800 to 40,000. Generally, the greater the Reynolds number, the greater the value of the negative maximum.

In actual linear flow meters, the usual value of $q$ is about 0.4 in. of water pressure. Therefore, with the optimum configuration of taps 20, 22 ($K_1 = 1$, $K_2 = -3$) the maximum correction that can be obtained is $4q$ or 1.6 in. of water. For a flowmeter having a 10 in. of water overall pressure drop, virtually complete compensation can be obtained for non-linearities up to 16%, i.e., 8.4 in. of linear drop and 1.6 in. of non-linear drop, and partial compensation for non-linearities in excess of this value.

Certain inherent characteristics of linear flow meters make practice of the instant invention highly advantageous. Thus, for example, the ability to correct for the non-linearity of a given meter permits a greater degree of latitude in placement of pressure taps 20, 22. Thus in linear flow meters constructed according to the practice of the aforementioned Weichbrod application, greatest accuracy is attained when the pressure taps are both disposed within the truly laminar flow region which exists only inside the flow restrictor and only at a considerable distance from both the inlet and outlet thereof. Placement of the taps outside the flow restrictor would make the same instrument less accurate by reason of non-linearity at the entrance and exit. Since the non-linear pressure drop follows Equation 1, employment of cylindrical pressure taps 20, 22 permits their placement outside the flow restrictor because their compensation can be made to substantially balance out the non-linearity.

In addition to the predictable phenomena of linearity and non-linearity which can be allowed for by proper construction of the flow meters, there always exists certain unpredictable errors which are, in effect, a characteristic of each individual flow meter. One example of each is the roughness of channel walls (in the flow restrictor). Every little obstruction in the flow stream causes formation of a vortex wave, which will either propagate downstream or be damped out (depending on the local value of the Reynolds number). In any event there will be a local velocity change which can only increase the magnitude of the non-linear term of Equation 1, and whose effect will be felt all the way down the channel. Both predictable and unpredictable deviations from linearity can be compensated for by constructing the preferred mode of flow meter illustrated in the drawing, and by assembling same according to the following technique.

FIGURE 1 diagrammatically illustrates the preferred form of flow meter where an elongated core 18 extends axially upstream and downstream from any conventional flow restrictor; preferably, the annular or spiral wrapped flow restrictors disclosed in the aforementioned Weichbrod application are employed. Cylindrical taps 20, 22 piercing the core member as shown, are each made turnable or rotatable about its own axis of symmetry. A set screw or other suitable locking element 30 is built into each end of arbor 18 to releasably hold each cylinder with its tap opening 24, 26 at predetermined angles to the direction of flow. With the angle $\theta$ preset at or near a theoretical optimum, e.g., $\theta_1=30°$; $\theta_2=0°$, the assembled flow meter is then calibrated against an accurate meter over its entire intended flow range. An angular adjustment in either or both tap cylinders is thereafter made to compensate for what has been discovered to be the instrument error, and the tap cylinders locked in this angular position. Invariably the tap openings of 20, 22 are at least 30° apart, mostly being 40°–80° apart, with the correction being almost always entirely in $\theta_1$. Once the taps are permanently locked in optimum position, the instrument is ready for use.

In order to allow as great a $q_0$ velocity head compensation as is reasonably possible, the annular flow area 19 at the taps should be made relatively small (thereby insuring a relatively high velocity at the taps). To this effect, a relatively large sized bulbous core can be employed in the flow restrictor. Also the taps should be placed in regions where housing 12 is most restricted in size, as for example, where the housing has been necked down at 13, 14 to allow insertion of the meter into a conduit. This latter expedient is illustrated in FIG. 1. FIGURE 2 illustrates the extent to which the resulting annular flow area 19 can be constricted within the normal sizes and proportions for linear flow meters.

Another advantageous mode of the instant invention is particularly adapted for use on meters where the housing 12 need not be necked down for insertion of the meter into the fluid flow line. With such a housing, as shown in FIGURE 5, the cylindrical taps 20, 22 are placed on arbor 18 directly adjacent the flow restrictor 15 and are then relied upon as structural elements which maintain the flow restrictor 15 in the desired fixed position.

In a typical 300 liters per minute air flow meter constructed according to the practice of the instant invention, the housing is 5 inches long and is 1⅜ inches in diameter with a 1/16″ wall. The core is 3½ inches long by ¾ inch in diameter and is provided with two No. 10 set screws in each end. The flow restrictor is 2½ inches long and fills the annulus between the ¾″ O.D. of the core and the 1¼″ I.D. of the housing. The two cylindrical taps are ¼″ in diameter with 1/16″ walls and are provided with two 3/64″ holes located 1″ on centers, the locations being at the mid radius of the annulus. The tap spacings are 2¾″ so that each tap cylinder properly restrains the flow restrictor. The resulting pressure drop through the flow meter is 10 inches of water at a full flow of 300 liters per minute of air.

While I have shown and described certain specific embodiments of the present invention, it will be readily understood by those skilled in the art that I do not wish to be limited exactly thereto, since various modifications may be made without departing from the scope of the invention as defined in the appended claims.

What is claimed is:

1. A linear flow meter comprising an elongated housing having a fluid inlet and a fluid outlet at the ends thereof, an elongated flow restrictor positioned inside said housing, and a pair of spaced apart pressure taps positioned on said housing intermediate the ends thereof, said taps being adapted for connection to an indicating instrument between said taps, said taps being disposed entirely outside the flow restrictor one on each side thereof, each tap being in the form of a hollow cylinder extending cross-wise of the fluid flow path through said housing, each cylinder having therein at least one small hole providing communication between the hollow cylinder and the fluid flow path.

2. The linear flow meter of claim 1 wherein the flow restricting pack is annularly disposed around an arbor which extends beyond the pack on both the upstream and the downstream end thereof, the cylindrical taps being mounted adjacent the ends of said arbor.

3. The linear flow meter of claim 2 wherein each cylindrical tap is provided with a small hole at the upper and at the lower mid radius of the resultingly annular fluid flow area between the arbor and the housing.

4. The linear flow meter of claim 2 wherein each cylindrical tap is mounted directly adjacent the flow restrictor, thereby serving as structural elements which maintain the flow restrictor in fixed position.

5. The linear flow meter of claim 1 wherein the hole in the upstream cylindrical tap is angularly offset from the hole in the downstream cylindrical tap, and wherein the downstream tap hole looks directly into the fluid flow.

6. A linear flow meter comprising an elongated housing having a fluid entranceway and a fluid exit passage at the ends thereof, an elongated flow restrictor inside said housing, and a pair of spaced apart pressure taps positioned on said housing intermediate the ends thereof adapted for connection to an indicating instrument, said taps being positioned entirely outside the flow restrictor one on each side thereof, and at least one tap being in the form of a hollow cylinder extending cross-wise of the fluid flow path through said housing and having at least one small hole therein for providing communication between the hollow cylinder and the fluid flow path.

7. The linear flow meter of claim 6 wherein the flow restricting pack is annularly disposed around a bulbous arbor which extends into the flow path beyond the pack and on which the said cylindrical tap is mounted, said tap further being positioned at a relatively narrow region of the elongated housing, whereby the resultingly annular flow area at the cylindrical tap is restricted.

References Cited in the file of this patent

UNITED STATES PATENTS

| | | |
|---|---|---|
| 1,508,017 | Greve | Sept. 9, 1924 |
| 1,702,274 | Schmidt | Feb. 19, 1929 |
| 2,163,730 | Goetzl | June 27, 1939 |
| 2,207,880 | Skoldberg | July 16, 1940 |
| 2,948,150 | Cornell | Aug. 9, 1960 |